Feb. 17, 1970   R. W. MARTIN   3,496,460
METHOD AND APPARATUS FOR REDUCING THE EFFECT OF PROCESS
NOISE IN THE OUTPUT SIGNAL OF A DUAL FREQUENCY
MATERIAL PROPERTY MEASURING SYSTEM
Original Filed July 28, 1965

ROBERT W. MARTIN
INVENTOR.

BY James J. O'Reilly
AGENT

3,496,460
METHOD AND APPARATUS FOR REDUCING THE EFFECT OF PROCESS NOISE IN THE OUTPUT SIGNAL OF A DUAL FREQUENCY MATERIAL PROPERTY MEASURING SYSTEM
Robert W. Martin, Dublin, Ohio, assignor to Industrial Nucleonics Corporation, a corporation of Ohio
Continuation of application Ser. No. 475,378, July 28, 1965. This application Apr. 22, 1968, Ser. No. 723,329
Int. Cl. G01r 27/26; H04b 1/10
U.S. Cl. 324—61                    20 Claims

ABSTRACT OF THE DISCLOSURE

Method and apparatus for reducing the effect of process noise in the output signal of a dual frequency property measuring system. The measuring system includes a moisture gauging system that measures by means of a probe the electrical admittance of the test material at two different frequencies. Two measuring channels are provided by passing the probe signal through filters each having a different passband located at the measuring frequencies. A separate noise measurement is made at a frequency different from said measuring frequencies, and combined with one of the channel measurements to equalize the noise contribution to each channel. In this manner, the noise is equalized in both channels so that the subsequent combination of their output signals does not result in any significant moisture offset.

---

This application is a continuation of application Ser. No. 475,378, filed July 28, 1965, now abandoned.

This invention relates generally to noise eliminators and more particularly to a novel method and means for reducing the effect of process noise in the output signal of a dual frequency material property measuring system.

BACKGROUND

Measuring systems are sometimes designed to determine one or more physical properties of a material by measuring the interaction of electrical energy with the material. Capacitance gauges which are one example are frequently employed as moisture transducers. Reference may be made to U.S. Patents 3,155,899 to A. R. Davidson; 3,155,900 and 3,155,901 to A. F. G. Hanken; and 3,155,902 to G. W. Walls all issued on Nov. 3, 1964 and assigned to the same assignee as the present invention for descriptions of exemplary measuring sytems. Magnetic caliper gauges that measure the air gap reluctance of two spaced poles are another example. Regardless of the type of transducer or principle involved, random noise introduced either by the transducer or originating within the system tends to hinder the measurement. Noise can originate in components such as transistors or resistors of low signal level stages of the system making it virtually impossible to distinguish from the signal representing the process variable. In all cases, the noise masks the desired property measurement and causes a general deterioration of the sensitivity of measurement.

Noise is a particular problem where the material being measured is a moving sheet that must be contacted by a probe. Described in a copending application Ser. No. 259,116, filed Feb. 18, 1963, now Patent No. 3,241,062 and assigned to the assignee of the present invention is a moisture gauging system that measures by means of a probe the electrical admittance of the sheet at two different frequencies. A signal is obtained at each of the two frequencies. When combined in a predetermined manner by a computer, the signals yield data indicative of the actual moisture content of the sheet. In fact, two measuring channels are constructed by passing the probe signal through filters each having a different passband located at the measuring frequencies. The relationship of the combined signal to moisture content is usually known only for a relatively quiet measurement, i.e. one in which the signal-to-noise ratio in each channel is quite large. A deterioration in the signal-to-noise ratio of either channel introduces an error into the measurement; this is termed an "offset" whereby the indicated value of percent moisture may differ by 0.1% or more from the actual value. Since the low frequency noise components of the transducer's output signal predominate, the effect on the dual frequency moisture measurement may be quite severe under certain conditions.

To discusss this frequency variation, it is convenient to use the term "power spectrum," meaning a graph of the noise power in watts per cycle plotted as a function of frequency $f$. The noise power of transduced signals is usually concentrated at the lower frequencies, the power being generally a $1/f$ function of frequency. Since the noise power is not the same at all frequencies of the spectrum, the channel output components that may be attributed to noise will be quite different for each channel, the lower frequency having by far the greater noise.

To diminish the deteriorating effect of noise, the present invention provides a method and means whereby a separate noise measurement is made at a frequency away from said signal frequency, and combined with one of the channel measurements to equalize the noise contribution to each channel. In a specific embodiment, I extract a noise sample from a frequency band slightly below the measuring frequencies of the dual frequency admittance gauge and attenuate the noise before adding it to the high frequency channel signal having the noise deficiency. In this manner, the noise is equalized in both channels so that the subsequent combination of their output signals does not result in any significant moisture offset.

OBJECTS OF THE PRESENT INVENTION

Accordingly, it is a primary object of the present invention to provide a method and means for reducing the effect of process noise on a material property measuring system.

It is also an object of the present invention to provide a noise eliminator that does not require the use of additional amplifiers.

It is another object of the present invention to provide a noise eliminator that can be readily added to measuring systems already in use.

It is a further object of the present invention to provide a noise eliminator that does not require complicated set up procedures and is not critical to adjust.

FIGURE DESCRIPTION

GENERAL DESCRIPTION

Figure 1:
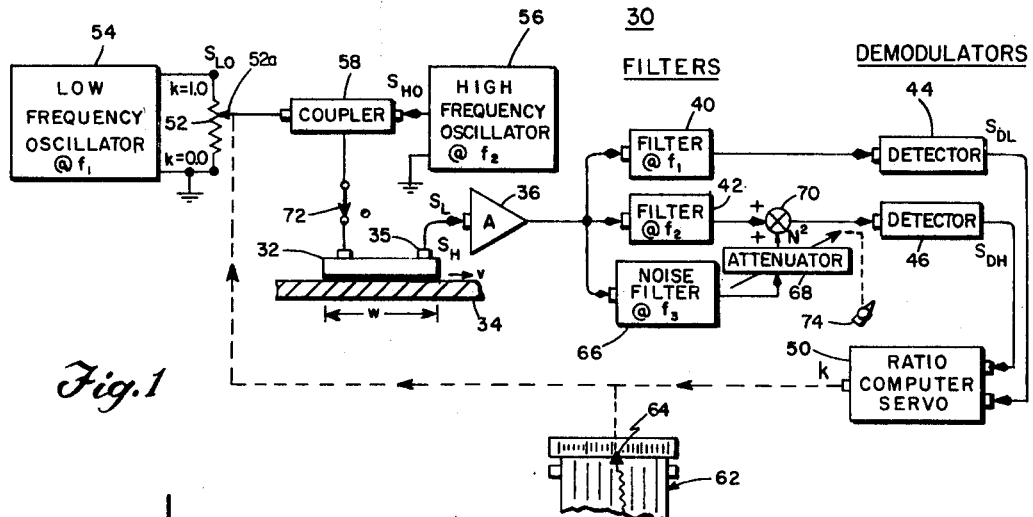
FIGURE 1 is a diagrammatic view, partly in section, of a dual frequency moisture gauging system constructed in accordance with the present invention.

The present invention is embodied in a dual frequency moisture gauge 30 diagrammatically shown in FIG. 1 of the drawings. A probe 32 such as a capacitance type engages a sheet material 34 and couples electrical energy into said material at two different frequencies $f_1$ and $f_2$. Probe 32 also senses the interaction of this energy with the sheet 34 and delivers a composite signal at an output terminal 35. The composite output signal contains signal components $S_L$ and $S_H$ at the signal frequencies $f_1$ and $f_2$ respectively modulated by the moisture content of the sheet 34. An amplifier 36 serves to increase the signal level of the probe output.

To separate the signal components $S_L$ and $S_H$ from the amplified composite signal, a pair of measuring channels are established by a pair of filters 40 and 42 connected to the output of amplifier 36. The filters pass a band of frequencies $\Delta f$ located at each signal frequency. The A.C. output of the filters is detected by a pair of demodulators 44 and 46. The D.C. output signals from the demodulators 44 and 46, $S_{DL}$ and $S_{DH}$ are supplied to a ratio computer servo 50.

Ratio computer 50 attempts to keep $$S_{DH} = S_{DL} \tag{1}$$

by altering the position of a tap 52a of a potentiometer 52 connected across the output voltage $S_{L0}$ generated by a low frequency oscillator 54. The potentiometer tap position may be designated by a quantity $k$ that may take on values between zero and unity. The output $S_{H0}$ of the high frequency oscillator 56 may be fed directly to a coupling unit 58, usually a transformer or a capacitance bridge network that couples both oscillator outputs to the probe 32.

The computer servo 50 then computes a value for $k$ that satisfies the equality stated above. It can be shown that $k$ is mathematically related to the ratio $S_H/S_L$ and corresponding to the moisture content $q$ as graphically illustrated in FIG. 2. The curve 60 represents a calibration curve for the moisture gauging instrument 30. Accordingly, an indicator such as a chart recorder 62 (FIG. 1) may be used to readout percent moisture if a marking pen 64 is mechanically coupled to the output 50a of the computer servo 50.

This system is more completely described in the above copending application.

NOISE CONSIDERATIONS

The above discussion assumes a negligible amount of noise in the system. Random noise, however, is inevitably present being primarily generated in the probe 32 by virtue of its contacting the sheet 34. The noise is usually distributed over a wide frequency spectrum. Since the noise is usually concentrated at the low frequency end of the spectrum, more noise creeps into the low frequency channel than into the high frequency channel. Therefore, even though computer servo 50 computes a value $k=k_1$ that maintains $S_{DL}=S_{DH}$, the indicated value for moisture, $q_1$, may be higher than the actual moisture content by an amount $\Delta q$ (see FIG. 2) because the noise in the low frequency channel demands a small value of $k$ from the computer 50 than it would have computed in the absence of noise.

Figure 3:
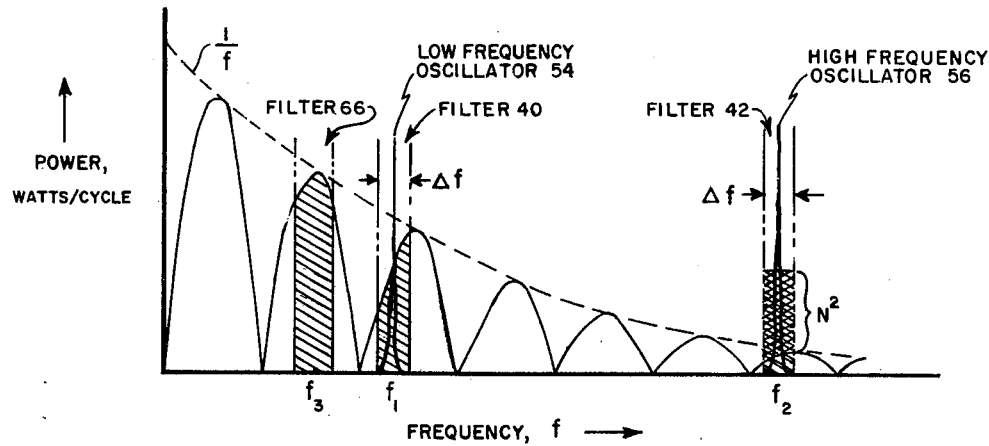
FIGURE 3 is a power spectrum illustrating the spectral relationship of the various signal and noise powers present in the moisture gauging system shown in FIG. 1.

Some feeling for the noise amplitude frequency relationship that exists in the illustrated embodiment may be transferred by FIG. 3. Shown is a power spectrum illustrating the $1/f$ noise power dependence upon frequency. The nulls in the spectrum are caused by the window averaging effect of the probe and are a function of the width of the probe and the speed of the sheet 34. For example, if the width $w$ of the probe 32 is 2.5 inches in the direction of movement of the sheet 34 at a speed $v=1,500$ ft./min., there will be a 125 c.p.s. spacing between adjacent nulls. The passband limits of the filters 40 and 42 are defined by the vertical lines about either side of the measuring frequencies $f_1$ and $f_2$. The spectrum provided by the oscillators 54 and 56 appears as a pair of sharp peaks. The shaded areas under the noise curve and between the filter cutoff frequencies are each proportional to the average noise power contained in that portion of the spectrum. It is apparent from FIG. 3 that the noise in the high frequency channel defined by filter 42 is much less than that existing in the low frequency channel. In fact, if the signal frequencies $f_1$ and $f_2$ are made 1 kc. and 10 kc. respectively, the noise power at 10 kc. will be about one-tenth that existing at 1 kc. (assuming equal filter bandwidths) and for all practical purposes can be disregarded.

Letting $N_L$ and $N_H$ represent the RMS noise voltage at the output of the low and high filters respectively, since the noise voltages of the filter outputs add in mean square, the demodulator output signals become $$S_{DL} = \sqrt{S_L^2 + N_L^2} \tag{2}$$

$$S_{DH} = \sqrt{S_H^2 + N_H^2} \tag{3}$$

By defining high and low frequency voltage signal-to-noise ratios, $$\Gamma_H = S_H/N_H \tag{4}$$

$$\Gamma_L = S_L/N_L \tag{5}$$

the value of $k$ computed in the presence of noise is related to the correct or desired value of $k$, by the following equation $$k_{computed} = k_{desired} \sqrt{\frac{1+\frac{1}{\Gamma_H^2}}{1+\frac{1}{\Gamma_L^2}}} \tag{6}$$

Since $\Gamma_H$ will be much larger than $\Gamma_L$, the radical may be approximated as $$\frac{1}{\sqrt{1+\frac{1}{\Gamma_L^2}}} \cong \frac{1}{1+\frac{1}{2\Gamma_L^2}} \cong 1 - \frac{1}{2\Gamma_L^2}$$

Therefore, Equation 6 becomes $$k_{computed} = k_{desired} \left[1 - \frac{1}{2\Gamma_L^2}\right] \tag{7}$$

Rewriting Equation 7

$$\Delta k = k_{desired} - k_{computed} = \frac{k_{desired}}{2\Gamma_L^2} \tag{8}$$

Figure 2:
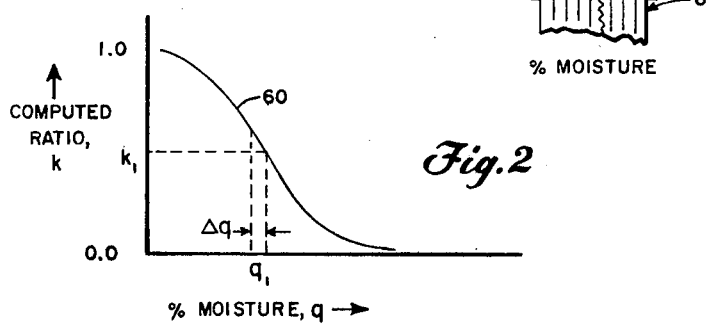
FIGURE 2 is a typical moisture calibration curve for the system shown in FIG. 1.

Since there is a corresponding change in indicated moisture content for this difference in computed $k$, as reflected by the calibration curve 60 in FIG. 2, there is a large dependence upon the low frequency signal-to-noise ratio $\Gamma_L$. The moisture offset $\Delta q$ becomes less, of course, as the signal-to-noise ratio $\Gamma_L$ increases.

Referring to Eq. 6 the computed and desired values of $k$ become identical when the signal-to-noise ratios $\Gamma_L$ and $\Gamma_H$ are equal. Alternatively, this obtains when the noise terms in Eqs. 2 and 3 are equal. To accomplish this condition, I add noise to the high frequency channel to make the noise terms under the radicals in Eqs. 2 and 3 equal.

Referring now to FIGS. 1 and 3, I sample the noise contained in the amplified composite signal at a frequency band located away from the signal frequences $f_1$ and $f_2$ so as not to pick up any $S_L$ or $S_H$ components. I insert a mean squared noise voltage $N^2$ into the high frequency channel to make the total noise term of Eq. 3

$$[N_H]^2_{total} = N_H^2 + N^2 \tag{9}$$

For this purpose, a third filter 66 is selected to pass a band of noise frequencies about a frequency $f_3$ selected close enough to the low signal frequency $f_1$ that the signal components track well but not so close that the skirts of filter 66 permit any appreciable 1 kc. signal to enter the high frequency channel. By tracking is meant the amplitude changes of the noise components in the outputs signals of filters 40 and 66 occur at the same point in time, to the same relative degree. Filter 66 should have approximately the same bandwidth $\Delta f$ as filter 40 to provide the signal tracking discussed above. The bandwidth $\Delta f$ should be wide enough to insure sufficient noise sampling in the event the spectrum nulls shift due to a change in material speed $v$, the mean square output voltage $N^2$ of filter 66 may be much greater than that required to establish the required noise balance. A variable attenuator 68 may be connected in tandem with the filter 66 to adjust the value of the added mean square noise voltage $N^2$ to make the following condition obtain $$N_H^2 + N^2 = N_L^2 \qquad (10)$$

The attenuator 68 could be connected at the input of filter 66 instead. The mean squared voltage $N^2$ may be summed with the output of filter 42 by means of a summing device 70 which may be simply a summing operational amplifier connected at the input of demodulator 46.

SYSTEM OPERATION

To set up my novel noise balance system, one first eliminates the moisture signals $S_L$ and $S_H$ from the system such as by opening a switch 72 connected between the oscillators 54 and 56 and the probe 32. The only signal components existing will be those due solely to the noise generated in the probe 32. A control knob 74 coupled to the attenuator 68 is then adjusted until the condition stated mathematically above by Eq. 10 is satisfied. This condition is satisfied when the demodulator output signals $S_{DH}$ and $S_{DL}$ are equal as indicated by a computed value for $k$ equal to 1.0. The marking indicator 64 of the chart recorder will go to the edge of the chart and draw a straight line when the attenuator 68 is properly adjusted. Alternatively, the computer servo 50 and recorder 62 could be disconnected and a meter used to monitor the demodulator signals. This adjustment provides for the addition of the noise power indicated by the X-hatched area shown in FIG. 3 to the high frequency noise already present.

Once balance is obtained switch 72 is closed and the system reads out the moisture content of the traveling sheet 34. Now when the signals $S_{DH}$ and $S_{DL}$ are made equal, $S_L$ must equal $S_H$ and the computed value of $k$ is related to a definitely known moisture content $q$.

ALTERNATIVE EMBODIMENTS

Other circuits may be constructed to provide the same result as described above. For example, a filter may be cut for a frequency intermediate $f_1$ and $f_2$ and an amplifying network may be used to boost the gain of the noise before it is added. It is, however, still advisable to locate the sampling as close as possible to the low frequency $f_1$. Some processes may exhibit an altogether different noise power spectrum in which case it may not be required either to attenuate or to amplify the sampled noise signal. In addition, some noise separation other than electrical filtering such as mechanical filtering may be used in some applications.

My system will work with magnetic reluctance probes, conductance sensors or other type of transducer prone to process noise infiltration. The sampled noise signal may be inserted into the system in many different ways depending on how the desired output signals are to be combined. For example, the noise filter A.C. output may be converted to a D.C. signal that may be combined with the demodulator signals. In some systems, the channels may include more extensive signal processing such as further amplification and filtering. Moreover, the channel output signals may be combined in many different ways depending on the mathematical dependence or relationship they bear to the desired process parameter. As a result, the point of insertion of noise to provide the desired equalization may vary somewhat with the particular application.

SUMMARY OF THE INVENTION

My invention has particular advantage when used with a dual frequency gauging system in which the process noise amplitudes are distributed through the signal frequencies as a known function of frequency. The balance or equalization approach used in the dual channel embodiment may even be modified and applied to a multiple-channel system with some measure of success.

What is claimed is:

1. The method of equalizing the noise contribution in the output of a dual channel measuring system wherein a physical property of a material is determined by coupling to said material a pair of electrical signals of different frequency to interact with said material and measuring the amplitude of said signals after interaction with said material to obtain a composite signal including noise components having amplitudes distributed as a known function of frequency along a wide frequency spectrum including said signal frequencies, and wherein said composite signal is passed through a first filter providing an output signal proportional to the combined contribution of signal and noise components occupying a frequency band including one of said signal frequencies and through a second filter providing an output signal proportional to the combined contribution of signal and noise components occupying a frequency band including the other of said signal frequencies, and means for comparing said filter output signals, said method comprising the steps of:

passing said composite signal through a third filter to provide an output signal proportional only to the noise components occupying a third frequency band excluding said signal frequencies, and combining said third filter output signal with one or the other of said first and said second filter output signals to equalize the contribution of said noise component to each of said compared signals.

2. The method of equalizing the noise contribution in the output of a dual channel measuring system wherein a physical property of a material is determined by coupling to said material a pair of electrical signals of different frequency to interact with said material and measuring the amplitude of said signals after interaction with said material to obtain a composite signal including noise components having amplitudes distributed as a known function of frequency along a wide frequency spectrum including said signal frequencies, and wherein said composite signal is passed through a first filter providing an output signal proportional to the combined contribution of signal and noise components occupying a frequency band including one of said signal frequencies and through a second filter providing an output signal proportional to the combined contribution of signal and noise components occupying a frequency band including the other of said signal frequencies, and means for comparing said filter output signals, said method comprising the steps of:

passing said composite signal through a third filter to obtain an output signal proportional only to the noise occupying a frequency band located away from said signal frequency bands, combining said third filter output signal with or the other of said first and second filter output signals, and adjusting the amplitude of said third filter output signal to make the noise component contribution to each of said compared filter output signals substantially equal.

3. The method of equalizing the noise contribution in the output of a dual channel measuring system wherein a physical property of a material is determined by coupling to said material a pair of electrical signals of a high and a low frequency to interact with said material and measuring the amplitude of said signals after interaction with said material to obtain a composite signal including noise components having amplitudes inversely proportional to frequency along a wide frequency spectrum including said signal frequencies, and wherein said composite signal is passed through a first filter providing an output signal proportional to the combined contribution of signal and noise components occupying a frequency band including said low signal frequency and through a second filter providing an output signal proportional to the combined contribution of signal and noise components occupying a frequency band including said high signal frequency, means for comparing said filter output signals, said method comprising the steps of:

passing said composite signal through a third filter to obtain an output signal proportional to the noise occupying a frequency band spectrally located below said signal frequency bands, combining said third filter output signal with one said first fiber output signal, uncoupling said pair of electrical signals from said material to remove said signal components from said first and said second filter output signals, and adjusting the amplitude of said third filter output signal to make said combined filter output signal substantially equal to said second filter output signal.

4. The method as set forth in claim 3 further including the step of:

recoupling said electrical signals to said material after said third filter output amplitude adjustment is completed to reinsert said signal components in said composite signal whereby any changes in said compared signals result solely from changes in said signal components.

5. A material property measuring system, comprising:

first oscillator means for generating a signal of frequency $f_1$, second oscillator means for generating a signal of frequency $f_2$, property sensing means coupled to said material and energized by said oscillator signals to provide a composite output signal including property-modulated signal components and noise components having a known amplitude distribution with frequency, means for separating said modulated signal components as well as noise components from said composite signal at each of said signal frequencies, means for computing the ratio of said separated signals to obtain an output signal indicative of said property, means for passing said composite signal through a filter to provide an output signal proportional to the noise components occupying a frequency band located away from said signal frequencies, means for combining said filtered output signal with one or the other of said separated signals, and means for adjusting the amplitude of said filtered output signal to equalize the contribution of noise components to said combined signal and said other separated signal.

6. A material property measuring system, comprising:

first oscillator means for generating a signal of relatively low frequency, second oscillator means for generating a signal of relatively high frequency, sensing means coupled to said material and energized by said oscillator signals to provide a composite output signal including property-modulated signal components at each of said oscillator frequencies and noise components having a known amplitude distribution with frequency, means for separating said modulated signal components as well as noise components from said composite signal at each of said signal frequencies, means for computing the ratio of said separated low and high frequency signals to obtain an output signal indicative of said property, means for passing said composite signal through a filter to provide an output signal proportional to the noise components occupying a frequency band located away from said signal frequencies, means for combining said filtered output signal with one or the other of said frequency separated signals, means for removing said property-modulated signal components from said composite signal, and means for adjusting the amplitude of said filtered output signal in accordance with said computed ratio until the noise component contribution to each of said combined high frequency signal and said low frequency signal is equalized.

7. A material property measuring system, comprising:

first oscillator means for generating a signal of relatively low frequency, second oscillator means for generating a signal of relatively high frequency, sensing means coupled to said material and energized by said oscillator signals to provide a composite output signal including property-modulated signal components at each of said oscillator frequencies and noise components having an amplitude inversely proportional to frequency, means for separating said modulated signal components as well as noise components from said composite signal, at said signal frequencies, means for computing the ratio of said separated low and high frequency signals to obtain an output signal indicative of said property, means for passing said composite signal through a filter to provide an output signal proportional to the noise components occupying a frequency band located below said low signal frequency, adjustable attenuator means for altering the amplitude of said filter output signal, means for summing said attenuated filter output signal with said separated high frequency signal, means for de-energizing said oscillator signals to remove said property-modulated signals from said composite signal, and means for adjusting said attenuator means in accordance with said computed ratio when said oscillators are de-energized to make the amplitude of said summed signals substantially equal to the amplitude of said separated low frequency signal.

8. In a dual frequency measuring system for determining the moisture content of a sheet material wherein a transducer provides a composite signal having moisture components at each of said dual frequencies proportional to said moisture content and noise components distributed along a continuous power spectrum including said dual measuring frequencies, the improvement comprising:

means for filtering said composite signal through a first filter to provide a first signal proportional to the average power of said composite signal in a first frequency band centered at one of said dual frequencies, means for filtering said composite signal through a second filter to provide a second signal proportional to the average power of said composite signal in a second frequency band centered at said other of said dual frequencies, the average power of said noise components in said first frequency band being proportional to the average power of said noise components in said second frequency band, means for filtering said composite signal through a third filter for providing a third signal proportional to the average noise power in a third frequency band excluding said dual frequencies, means for combining a portion of said third filter signal with one of said first and second filter signals, means for comparing said combined signal with said other filter signal, means for adjusting said combined portion of said third filter signal to equalize the contribution of said noise components to each of said compared signals, and means for utilizing said compared signals to indicate the moisture content of said sheet.

9. The method of equalizing the noise contribution in the output of a dual channel measuring system wherein a physical property of a material is determined by coupling to said material a pair of electrical signals of different frequency to interact with said material and measuring the amplitude of said signals after interaction with said material to obtain a composite signal including noise components having a frequency spectrum including said signal frequencies, and wherein said composite signal is passed through a first filter providing an output signal proportional to the combined contribution of signal and noise components occupying a frequency band including one of said signal frequencies and through a second filter providing an output signal proportional to the combined contribution of signal and noise components occupying a frequency band including the other of said signal frequencies, and means for comparing said filter output signals, said method comprising the steps of:

passing said composite signal through a third filter to provide an output signal proportional only to the noise components occupying a third frequency band excluding said signal frequencies, and combining said third filter output signal with one or the other of said first and said second filter output signals to equalize the contribution of said noise component to each of said compared signals.

10. The method of equalizing the noise contribution in the output of a dual channel measuring system wherein a physical property of a material is determined by coupling to said material a pair of electrical signals of different frequency to interact with said material and measuring the amplitude of said signals after interaction with said material to obtain a composite signal including noise components having a frequency spectrum including said signal frequencies, and wherein said composite signal is passed through a first filter providing an output signal proportional to the combined contribution of signal and noise components occupying a frequency band including one of said signal frequencies and through a second filter providing an output signal proportional to the combined contribution of signal and noise components occupying a frequency band including the other of said signal frequencies, and means for comparing said filter output signals, said method comprising the steps of:

passing said composite signal through a third filter to obtain an output signal proportional only to the noise occupying a frequency band located away from said signal frequency bands, combining said third filter output signal with one or the other of said first and second filter output signals, and adjusting the amplitude of said third filter output signal to make the noise component contribution to each of said compared filter output signals substantially equal.

11. A material property measuring system, comprising:

first oscillator means for generating a signal of frequency $f_1$, second oscillator means for generating a signal of frequency $f_2$, property sensing means coupled to said material and energized by said oscillator signals to provide a composite output signal including property-modulated signal components and noise components, means for separating said modulated signal components as well as noise components from said composite signal at each of said signal frequencies, means for computing the ratio of said separated signals to obtain an output signal indicative of said property, means for passing said composite signal through a filter to provide an output signal proportional to the noise components occupying a frequency band located away from said signal frequencies, means for combining said filtered output signal with one or the other of said separated signals, and means for adjusting the amplitude of said filtered output signal to equalize the contribution of noise components to said combined signal and said other separated signal.

12. In a dual frequency measuring system for determining the moisture content of a sheet material wherein a transducer provides a composite signal having moisture components at each of said dual frequencies proportional to said moisture content and noise components distributed along a power spectrum including said dual measuring frequencies, the improvement comprising:

means for filtering said composite signal through a first filter to provide a first signal proportional to the average power of said composite signal in a first frequency band centered at one of said dual frequencies, means for filtering said composite signal through a second filter to provide a second signal proportional to the average power of said composite signal in a second frequency band centered at said other of said dual frequencies, the average power of said noise components in said first frequency band being proportional to the average power of said noise components in said second frequency band, means for filtering said composite signal through a third filter for providing a third signal proportional to the average noise power in a third frequency band excluding said dual frequencies, means for combining a portion of said third filter signal with one of said first and second filter signals, means for comparing said combined signal with said other filter signal, means for adjusting said combined portion of said third filter signal to equalize the contribution of said noise components to each of said compared signals, and means for utilizing said compared signals to indicate the moisture content of said sheet.

13. In apparatus for determining at least one material property of a material including means coupled to said material for providing a composite output signal including noise components having a frequency spectrum and at least two property-modulated signal components, each occurring at a different frequency within said noise spectrum, whereat the amplitudes of said noise components are substantially different, and means responsive to said property-modulated signal components for indicating said material property, the improvement comprising:

means for monitoring said composite signal to provide a signal proportional to the noise components occupying a frequency band different from any of said property-modulated signal components, and means for combining said noise signal with one or the other of said property-modulated signal components to substantially equalize the contribution of noise to each of said property-modulated signal components.

14. In apparatus for determining at least one material property of a material including means coupled to said material for providing a composite output signal including noise components having a frequency spectrum and at least two measurement signal components, each occurring at a different frequency within said noise spectrum, whereat the amplitudes of said noise components are substantially different, and means responsive to said measurement signal components for indicating said material property, the improvement comprising:

means for monitoring said composite signal to provide a signal proportional to the noise components occupying a frequency band different from any of said measurement signal components, and means for combining said noise signal with one or the other of said measurement signal components to substantially equalize the contribution of noise to each of said measurement signal components.

15. Apparatus as in claim 14 in which said monitoring means comprises a frequency filter.

16. Apparatus as in claim 14 in which said signal combining means further includes means for adjusting the amplitude of said noise signal.

17. In apparatus for determining at least one material property of a material including means coupled to said material for providing a composite output signal including noise components having a frequency spectrum and at least two property-modulated signal components, each occurring at a different frequency within said noise spectrum, whereat the amplitudes of said noise components are substantially different, and means responsive to said property-modulated signal components for indicating said material property, the improvement comprising:
  means for monitoring said composite signal to provide a signal proportional to the noise components occupying a frequency band different from any of said property-modulated signal components,
  means for combining said noise signal with one or the other of said property-modulated signal components to substantially equalize the contribution of noise to each of said property-modulated signal components,
  means for removing said property-modulated signal components from said composite signal, and
  means for adjusting the amplitude of said noise signal to substantially equalize said noise components.

18. Apparatus as in claim 17 in which said monitoring means comprises a frequency filter.

19. In apparatus for determining the moisture content of a material including means coupled to said material for providing a composite signal including noise components having a frequency spectrum and at least two moisture components, each occurring at a different frequency within said noise spectrum, whereat the amplitudes of said noise components are substantially different, and means responsive to said moisture components for indicating the moisture content of said material, the improvement comprising:
  filter means for monitoring said composite signal to provide a signal proportional to the noise components occupying a frequency band different from any of said moisture frequencies, and
  means for combining said noise signal with one or the other of said moisture components to substantially equalize the contribution of noise to each of said moisture components.

20. Apparatus as in claim 19 in which said signal combining means further includes means for adjusting the amplitude of said noise signal.

References Cited

UNITED STATES PATENTS 3,155,899  11/1964  Davidson. _____ 324—61

EDWARD E. KUBASIEWICZ, Primary Examiner

U.S. Cl. X.R.

325—473